2,914,883

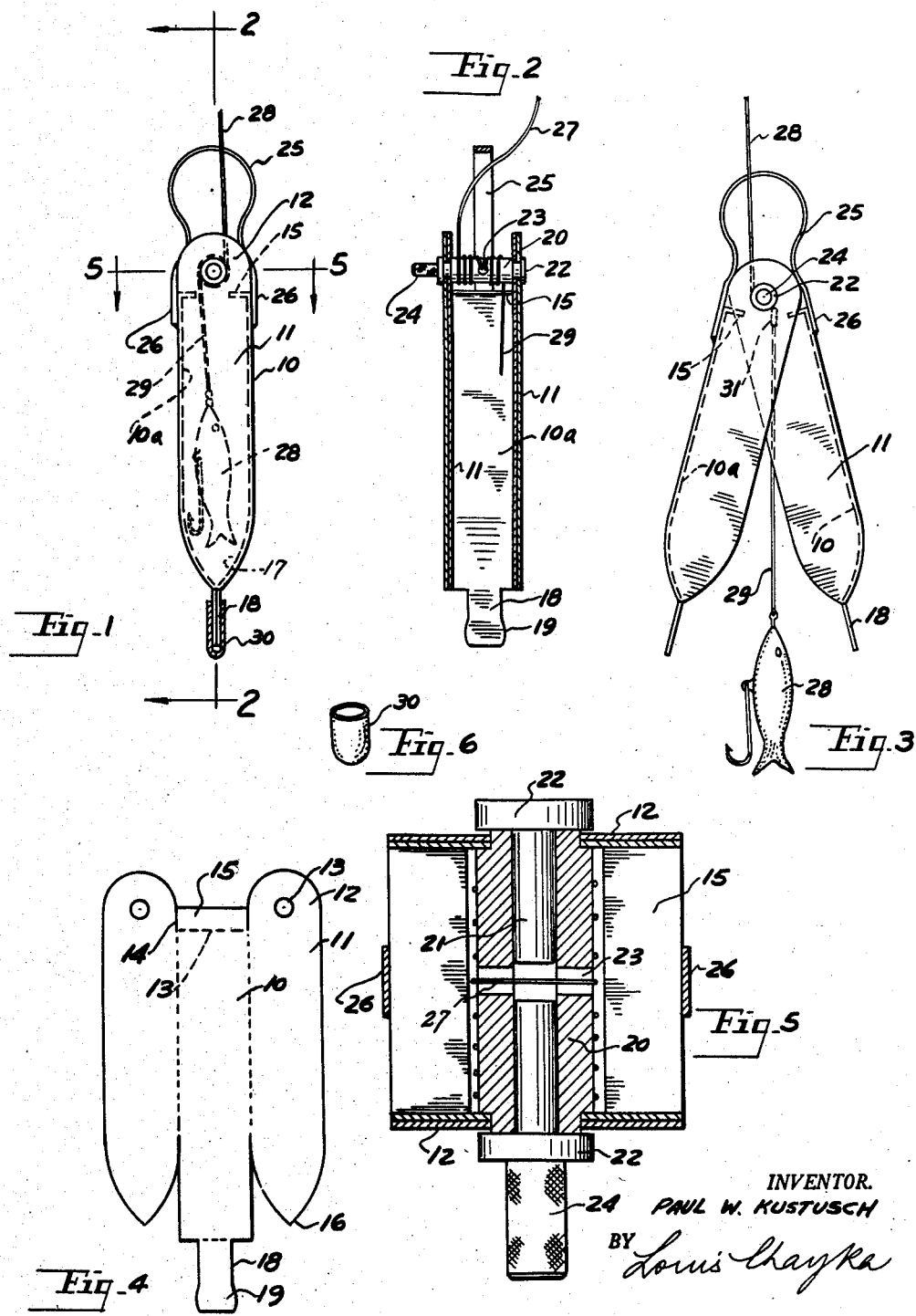

FISH LURE CASTING DEVICE

Paul W. Kustusch, Grosse Pointe, Mich.

Application October 3, 1957, Serial No. 687,925

4 Claims. (Cl. 43—41.2)

The invention pertains to a container in which a hook-carrying lure, such as a minnow or crab, be it natural or simulated, may be enclosed for casting said lure. The container, which is attached to the fish line by means of which it is to be cast upon a body of water, is of a kind which is closed during the casting but which is adapted to open automatically when immersed in water. This is effected by a combination of elements, including spring means tending to keep the container in its open position and water-soluble means which are designed to keep the container closed against the tension of the spring means till they have been weakened or dissolved.

I shall now describe said invention with reference to the accompanying drawings in which:

Fig. 1 is a side elevational view of my device in its closed condition;

Fig. 2 is a vertical sectional view of the device on line 2—2 of Fig. 1;

Fig. 3 is a side elevational view of said device in its open condition;

Fig. 4 is a plane elevational view of a blank of a component part of the device;

Fig. 5 is an enlarged sectional view of the device on line 5—5 of Fig. 1;

Fig. 6 is a perspective view of a gelatin capsule to be used with my device.

Similar numerals refer to similar parts throughout the several views.

The container is composed of two principal parts, each made of a blank such as shown in Fig. 4. The blank may be made of metal or any other suitable material. When formed properly for use, each said component part has the shape of an oblong shell which is U-shaped in cross-section and which includes an oblong wall or bottom 10 and two side walls 11 which are disposed parallel to each other. At one end each of the side walls extends beyond the respective end of the wall 10, forming an ear 12 which is provided with a hole 13, the hole in one ear being in register with that of the other ear. A length of said wall 10 at the end adjoining said ears 12 is severed from the sidewalls, as shown at 14, and is bent at right angle to fit between said side walls and to form a low, transversely-disposed end wall 15 of the shell.

At the opposite end each of the sidewalls is tapered to a sharp point, as shown at 16, while said back wall 10 curves to meet the receding edges of the sidewalls so that at this end the back wall is curved to a radius. Extending outwardly from said end, but being integrally connected thereto, is a flat tongue 18 which terminates with a laterally-expanded portion 19.

The two shells of the container are identical, except for the fact that the back wall 10 of one is narrower than the back wall 10a of the other, so that the sidewalls of one, including its ears, may fit between the sidewalls of the other. The shells are hinged to each other by means of a roller 20 which at each end fits into apertures 13 in the two ears on that side of the shell. The roller includes an axial shaft 21, the latter being provided at each end of the roller with an expanded, disk-like head 22. Midway its length the roller contains a diametrical aperture 23 which extends also through the shaft. Finally, at one end, the roller is provided with an axial knob 24 by means of which the roller may be turned manually about its axis.

Normally the two shells diverge from their hinged portions outwardly so that the container is open, as shown in Fig. 3. This is due to a spring of a hairpin type which includes a loop 25 and two legs 26, one of which is secured to the outer surface of the back wall of one shell, while the other leg is similarly connected to the other shell. The connection of said legs to the shells may be effected in any suitable manner, such as by brazing.

The container is adapted to be suspended from a fish-line 27. For this purpose the fish-line is drawn into the interior of the container from one end, between the two end walls 15, whereupon the line is threaded through the diametrical aperture 23 and pulled downwardly till a desired length of it will be available for support of a lure 28 when in water at a desired level below the container. It will be understood that the lure is to be attached to the end of the line extending from the roller downwardly, this length being identified by numeral 29. For a reason which will be presently explained, it is desirable that a sinker 31 be attached to the line at a point below said roller.

The manner in which the device may be used is as follows:

When the container is open and the line 29 with the lure at the end thereof extends downwardly and outwardly thereof, the lure may be drawn up into the container. This is done by having the line 29 wound up upon the roller by means of the knob. It will be understood that during the rotation of the roller the line 29 will be wound upon one-half of the roller to one side of the aperture 23, while the line 27 above the roller will be simultaneously wound upon the other half of the roller.

When the lure has been fully drawn into the container, the two shells are closed manually till the tongue 18 of one will be in abutment with the tongue of the other, whereupon a gelatin capsule 30 is forced upon both to hold the shells in place against the tension of the spring.

Once the container has been cast into water, the capsule will dissolve and the shells will spring back from each other. As a result, the line 29 will unroll under the weight of the lure which will sink below the level of the container. Normally, the container, by reason of its weight, would slide down the line which passes through the aperture 23 of the roller. However, this will be prevented by the sinker 31, the diameter of which is larger than that of said aperture 23.

After having described my device, I wish to protect said device by the following claims:

1. A fish lure casting container comprising two oblong shells hinged to each other at one end, each of the shells terminating at the other end with a tongue extending outwardly, spring means to cause the shells to swing apart from each other from their hinged ends, a roller disposed transversely to the length of the shells and journalled upon the hinge within the hinged ends thereof for rotation about its axis, a knob extending outwardly from one end of the roller for manual operation of the roller, a length of fish line adapted to be reeled up upon the roller and terminating with a fish lure adapted to fit into the container, said spring means being adapted to keep the shells in a normally spread position from each other, the shells being adapted to be swung towards each other manually against the tension of the spring means, and a member adapted to fit over the two tongues after the shells have been so swung towards each other to keep the shells from spreading apart, the member being adapted to disintegrate when immersed in water.

2. A fish lure casting container comprising two oblong shells, each including a back wall and two parallel sidewalls, the shells being at one end hinged to each other by means which connect said sidewalls, each of the shells including at the other end a tongue extending outwardly therefrom, a roller disposed transversely to the length of the container and journalled upon the hinge within the hinged ends for rotation about its axis, a knob extending from one end of the roller, a length of fishline adapted to be wound upon the roller, a lure connected to the line and adapted to fit into the container, spring means to hold the two shells in a spread-apart position, the shells being adapted to be swung towards each other manually for longitudinal abutment along their full lengths to enclose said lure, and a replaceable water-soluble member to fit over the two tongues to keep the shells against spreading apart.

3. A fish lure casting container comprising two oblong shells each of which is U-shaped in cross-section, the shells being hinged to each other at one end of said container, each of the shells being provided at its other end with an outwardly-extending tongue for contact with the tongue of the other shell, spring means at the hinged end of the container to keep the shells normally spread apart, a roller journalled upon the hinge in the hinged end of the container, a knob extending outwardly from one end of said roller for operation thereof, a length of fish line engaged to said roller, a fish lure attached to the fish line and adapted to fit into the container, the fish line being adapted to be reeled up upon said roller, the shells being adapted to be swung towards each other from the spread-apart positions to enclose the lure and to bring the two tongues together, and a water-soluble member to fit over the tongues to hold the shells against spreading apart.

4. A lure casting container comprising two oblong shells each having at one end two flat ears spaced from each other and a flat tongue extending outwardly from the other end, means to hold the two shells in a hinged relation to each other, the means including a roller which at each end is journalled in a pair of ears, one of which ears forms a part of one shell, the other a part of the other shell, the roller being provided, midway its length, with a diametrical aperture, a fish line threaded through said aperture, a lure affixed to one end, which is the outer end of the fish line, spring means to keep the two shells spread apart from their respective hinged ends, a knob extending from one end of the roller to reel up the line thereon by means of said knob till the lure has been drawn up to a position between the two shells, the shells being adapted to be swung towards each other against the tension of the spring means till the tongue of one has come into a parallel abutment with the tongue of the other, and a replaceable water-soluble member adapted to engage the two tongues to hold the two shells against spreading apart.

References Cited in the file of this patent

UNITED STATES PATENTS

| 2,308,238 | Baker | Jan. 12, 1943 |
| 2,669,054 | Smith | Feb. 16, 1954 |

FOREIGN PATENTS

| 981,788 | France | Jan. 17, 1951 |